United States Patent [19]

Fentress

[11] Patent Number: 5,253,315

[45] Date of Patent: Oct. 12, 1993

[54] METHOD AND APPARATUS FOR INSTALLING A FIBER OPTIC CABLE BY CAPTURE OF A COUPLING NUT OR COUPLING NUT ASSEMBLY

[76] Inventor: Vernon A. Fentress, 10 Marjorie Rd., Burlington, Mass. 01803

[21] Appl. No.: 800,745

[22] Filed: Nov. 29, 1991

Related U.S. Application Data

[63] Continuation-in-part of Ser. No. 633,149, Dec. 24, 1990, abandoned.

[51] Int. Cl.$^5$ .............................................. G02B 6/36
[52] U.S. Cl. ...................................... 385/78; 385/77; 385/76
[58] Field of Search ............................ 350/96.2, 96.21; 385/53, 72, 75, 88, 89, 92, 76, 77, 78, 86

[56] References Cited

U.S. PATENT DOCUMENTS

| | | | |
|---|---|---|---|
| 4,911,518 | 3/1990 | Miller | 350/96.21 X |
| 4,953,941 | 9/1990 | Takahashi | 350/96.2 |
| 5,024,503 | 6/1991 | Gunn et al. | 350/96.2 |

Primary Examiner—John D. Lee
Assistant Examiner—Stephen W. Barns
Attorney, Agent, or Firm—George Grayson

[57] ABSTRACT

A new and improved apparatus and method for use in installing fiber optic cable, one embodiment of which utilizes a novel connector-coupling nut assembly, is disclosed herein. The apparatus largely comprises an elongated connector body with spring means disposed about the body's circumference for receiving and retaining a coupling nut which has a threaded internal configuration for mating with the spring means of the elongated connector body. When received by the connector body, the novel coupling nut is held in a securely captive position along the elongated connector body by suitable retaining means configured about the exterior surface of the connector body and the interior surface of the coupling nut, which means interact with each other. A second embodiment of this invention utilizes a novel connector-coupling nut assembly which comprises an elongated connector body with a shoulder and retaining means disposed about the body's circumference for receiving and retaining a coupling nut which has an internal shoulder and retaining means disposed about the circumference of the coupling nut for mating with the shoulder and retaining means of the elongated connector body. When received by the connector body, the novel coupling nut is held in a securely captive position along the elongated connector body by the retaining means of the body and coupling nut which means interact with each other. In a third embodiment of this invention of this invention, a universal connector body is provided with the capability of mating with most existing connectors on the market. This universal capability is afforded by providing a universal inner housing which mates with a wide variety of coupling nut assemblies or outer housings, allowing these coupling nut assemblies or outer housings to mate with the universal connector body. The connector body design has the fiber terminated to a precision tip, which is spring-loaded within the housing to which the strength member is terminated to prevent interruption of the optical signal if the cable is pulled or otherwise disturbed. This design also provides for the take-up of slack buffered fiber due to the retraction of the spring-loaded tip. The manner in which the universal connector body mates with the universal inner housing provides a method of indexing the rotation of the connector body, allowing it to be tuned as to insertion loss upon installation or thereafter. The inner housing is compatible with a wide variety of connector outer housings, including ST, SC, FC, D4, and high-density types described herein.

30 Claims, 8 Drawing Sheets

METHOD AND APPARATUS FOR INSTALLING A FIBER OPTIC CABLE BY CAPTURE OF A COUPLING NUT OR COUPLING NUT ASSEMBLY

This is a continuation-in-part of U.S. application Ser. No. 07-633,149 filed on Dec. 24, 1990, (now abandoned) having the same title, the same inventor and retaining the original filing date of the prior application.

TECHNICAL FIELD

This invention relates to a method and apparatus for installing pre-connectorized fiber optic cables. More particularly, the invention relates to novel connectors and coupling assemblies which allow for factory connectorization of fiber optic cables and for ease of cable installation in the field by providing for a reduced installation profile for the connector bundle.

BACKGROUND ART

Typically, fiber optic cables installed in or between buildings to enable intra-organizational data and telephone communications are housed in conduits and connected with de-matable connectors. The benefits of fiber optics for use in these local networks are many; however, the primary benefit lies in the ability to send the information of many telecommunication instruments over an exceedingly small number of channels as compared to conventional copper cables. A single pair of optical fibers may, in fact, replace several hundred pairs of copper cables.

Because of the present tendency toward high capacity small cables, fiber optic cables are often installable where conventional copper or coaxial cables of equivalent capacity will not fit, e.g., small or congested cable ducts. Copper or coaxial cable bundles are large as 100 mm in diameter can be avoided in favor of fiber optic cables as small as 3 mm in diameter.

Unfortunately, single channel de-matable fiber optic connectors used to terminate the cable are typically 8 to 20 millimeters in diameter. This results in connector bundle sizes several times the diameter of the cable. For example, a typical AT&T Technologies connector used to terminate a typical 6 channel, 8 mm diameter, fiber optic cable will result in a bundle size of 36.7 mm which is over four (4) times the size of the cable. The National Electrical Code limits a single cable to 53% of the conduit area. Thus, the 8 mm cable can easily fit a ½ inch standard conduit. The same cable with pre-installed connectors would require a 1½ inch standard conduit just to clear the connector bundle. Pulling equipment may dictate an even larger size conduit. The existence of previously installed cable and/or a series of 90 degree conduit bends might raise the required conduit size even higher. To compound these problems, the typical cable grip used to install cables in conduits does not expand more than a few percent larger than the minimum allowable cable diameter, i.e., it will not fit over a connector bundle with a diameter more than a few percent larger than the cable diameter.

This situation has almost universally resulted in field connectorization (as opposed to the more desirable factory connectorization) of duct-installed fiber optic cables. Unfortunately, to install the typically epoxy and polish connector takes approximately 20 to 40 minutes per end (two ends per connection) requiring approximately 40 separate steps. For example, some of these required steps include: (1) stripping the jacket away from the cable; (2) folding back the Kevlar material and stripping the buffer material; (3) cleaving or putting a break in the fiber such that the break is perpendicular to the axis of the fiber; (4) cementing the fiber inside of the connector with epoxy; and (5) polishing the fiber optic connector. The connectors may each cost as much as $25.00 or more. An incorrect installation or accidental breakage of the fragile fiber may necessitate that the connector be cut off, discarded and a new installation procedure begun having to again perform all of the time-consuming steps including that of polishing the connector which is perhaps the most time-consuming. As a result, field installation of de-matable connectors is performed by highly skilled personnel. It is not uncommon for this connectorization to be done by highly skilled, degreed engineers.

In a previous U.S. Pat. No. 4,711,517, the authors address the issue by providing for coupling nut installation after cable installation by pushing the coupling nut, which has an expandable internal spring clip, over the bevelled land of the connector body. The spring clip is finally captured in a groove around the connector body. Alternatively, internal to the coupling nut is a bevelled land which compressed a spring clip captured in a groove around the connector body as the coupling nut is pushed over the connector body. Finally the boss or the bevelled land is captured between the spring clip and the stationary clip of the connector body. However, the approaches of U.S. Pat. No. 4,711,517 require modifications of existing connector designs which are impractical in many cases. The apparatus and method described herein results in an improved approach to post-installation of the coupling nut compatible with existing connector designs.

In view of the foregoing problems, it is apparent that there is a need in the fiber optic art and industry for an improved apparatus and method for installing fiber optic cables which would allow for the tedious and time-consuming connectorization of fiber optic cables in the factory prior to the field installation of the cable. Moreover, there is a need for an approach to factory installation which can be applied to the majority of connectors being used in local area networks.

Accordingly, I have invented a new and improved method and apparatus which primarily comprises novel connector assemblies which may be assembled on the fiber optic cable in the factory where all of the tedious steps to prepare the cable and connector may be done.

It is, therefore, an object of the present invention to provide a means of reducing both the cost and complexity of fiber optic cable duct installation by enabling factory performance of the complex fiber/connector mate and polish process, while field personnel can use conventional cable installation equipment and processes to place the pre-connected cable in the customer's conduit.

SUMMARY OF THE INVENTION

According to one aspect of the present invention, there is provided a cable. The cable may have a single unit or may be one unit of a multi-fiber cable. The optical fiber cable is secured to the connector body without the connector nut. The fiber end of the connector body is polished or otherwise made smooth and flat. The connector body is provided with a circumferential groove at its midsection, containing a retaining ring. The connector body has also been provided with a spring with one end secured nearest the fiber end of the connector and with its opposite end toward the retaining ring or the connector. At this point, the connector assembled on the cable has its smallest profile facilitating the easiest installation in the cable conduit. After installation, the connector coupling nut used to mate and un-mate the connector bodies is screwed onto the spring and connector body until it is captured between the end of the and the retaining ring seated in the circumferential groove on the connector body. This process is facilitated by providing spiral grooves, to accommodate the spring, on the inside diameter of the connector coupling nut.

Alternatively, the connector body may be provided with a second circumferential groove at the end nearest the fiber end of the connector containing a retaining ring to accept the thrust of the secured end of the spring.

According to another aspect of this invention, the connector body is provided with a circumferential shoulder at its midsection. At this point, the connector bundle assembled on the cable has its smallest profile facilitating the easiest installation in the cable conduit. After installation, the connector coupling nut assembly used to mate and un-mate the connector bodies is slid onto the connector body and secured in place with a suitable fastening method.

According to another aspect of this invention, a universal connector body is provided with the capability of mating with most existing connectors on the market. This universal capability is afforded by providing a universal inner housing which mates with a wide variety of coupling nut assemblies or outer housings, allowing these coupling nut assemblies or outer housings to mate with the universal connector body. The connector body design has the fiber terminated to a precision tip, which is spring-loaded within the housing to which the strength member is terminated to prevent interruption of the optical signal if the cable is pulled or otherwise disturbed. This design also provides for the take-up of slack buffered fiber due to the retraction of the spring-loaded tip. The manner in which the universal connector body mates with the universal inner housing provides a method of indexing the rotation of the connector body, allowing it to be tuned as to insertion loss upon installation or thereafter. The inner housing is compatible with a wide variety of connector outer housings, including ST, SC, FC, D4, and high-density types described herein.

The termination of the connector body to an optical fiber is facilitated by its unique design, which greatly simplifies the process as compared to conventional pull-proof connectors. The connector body may be terminated for pulling through a building duct by employing a unique process and a special pull boot described herein.

Finally, a unique high-density ST-compatible simplex or duplex push-pull outer housing design is described which is compatible with the universal connector body and inner housing. (ST is a trademark of AT&T.) Other connector type adaptations for the outer housing of the Universal Connector Body are also provided.

BRIEF DESCRIPTION OF THE DRAWINGS

FIG. 3a is a cross-section of the connector body of FIG. 1a without the coupling nut of FIG. 2a.

BEST MODE FOR CARRYING OUT THE INVENTION

The drawings depict typical configurations of commercially available connectors.

Figure 1A:
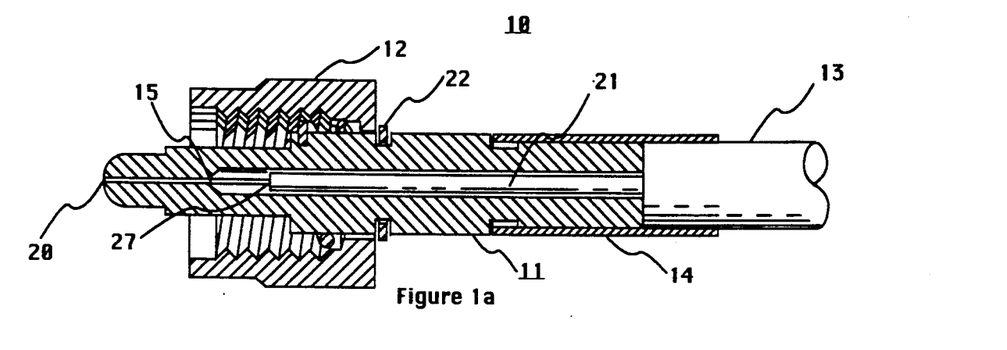
FIG. 1a is a cross-section of the connector and coupling nut in a captured condition for one embodiment of the invention.
Figure 2A:
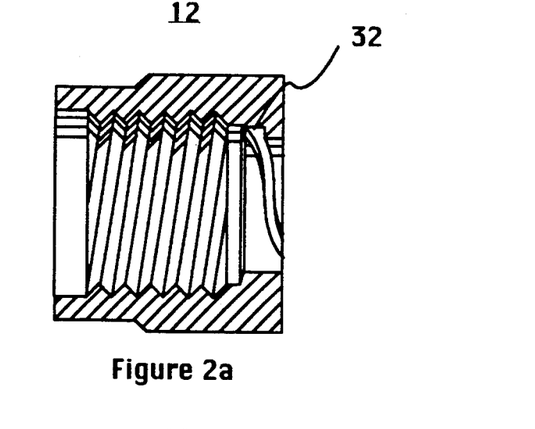
FIG. 2a is a cross-section of FIG. 1a without the connector body.
Figure 3A:
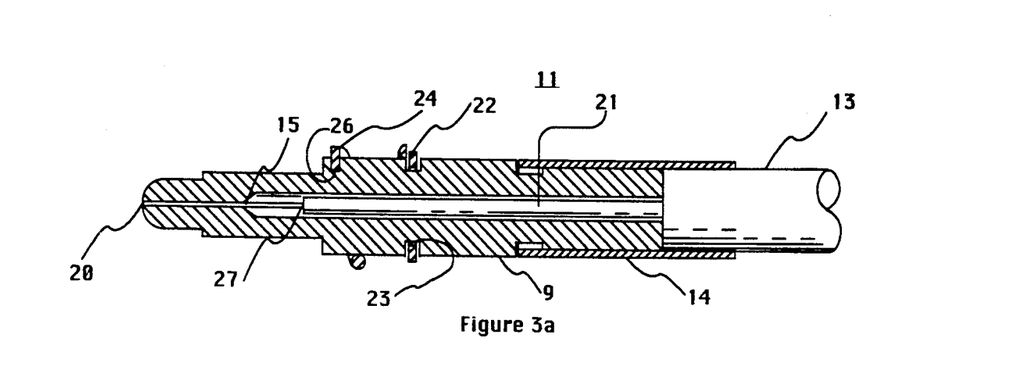

Reference is made to FIGS. 1a, 2a, and 3a of the drawings in detail which show three embodiments of the connector assembly of the present invention generally designated 10, 11, and 12, respectively. The assembly 10 of FIG. 1a comprises a combined coupling nut 12 of FIG. 2a and connector assembly 11 of FIG. 3a, attached to a cable 13.

Referring to FIG. 3a, the connector assembly 11 has a spring clip 22 installed in a groove 23 of connector body 9. Connector assembly 11 also has a spring 24, with an internal diameter somewhat larger than that of connector body 9, installed so that the end distant from the spring clip 22 is secured at a point 26 to prevent rotation. The connector assembly 11 which includes clip 22 and spring 24, is installed on a fiber optic cable 13 by a crimp sleeve 14 or other means. The cable 13 contains a fiber 15 covered by a buffer coating 21 which is partially stripped back to point 27 to facilitate fiber end preparation. A fiber end 20 is prepared and the assembly 11, attached to cable 13, is installed in a duct or other facility in preparation for connection to a communication or data device. After installation in a duct or other facility, the coupling nut 12 is installed to enable connection to the communication or data device.

Referring to FIG. 2a, the coupling nut 12 has an internal groove 32 with an outside diameter somewhat larger than the outside diameter of the spring 24 and inside diameter somewhat larger than the outside diameter of the connector body 9. This groove 32 allows the coupling nut 12 to be screwed onto the spring 24 secured to connector body 9. Spring 24 enters groove 32 at entry point 34.

The coupling nut 12 is installed by placing the grooved end of the nut 12 over the fiber end 20 of the connector until the grooved end of the coupling nut 12 rests against the end of the spring 24. Rotation of the coupling nut 12 allows the end of the spring 24 to mate with the groove entry point 34. The coupling nut 12 is then screwed onto the spring 24 and connector body 9 until the coupling nut 12 rests between the spring 24 and the retaining clip 22, as shown in FIG. 1a. The continuing rotation of nut 12 compressed the spring 24 resulting in nut 12 being captured between the end of spring 24 and clip 22.

Figure 1B:
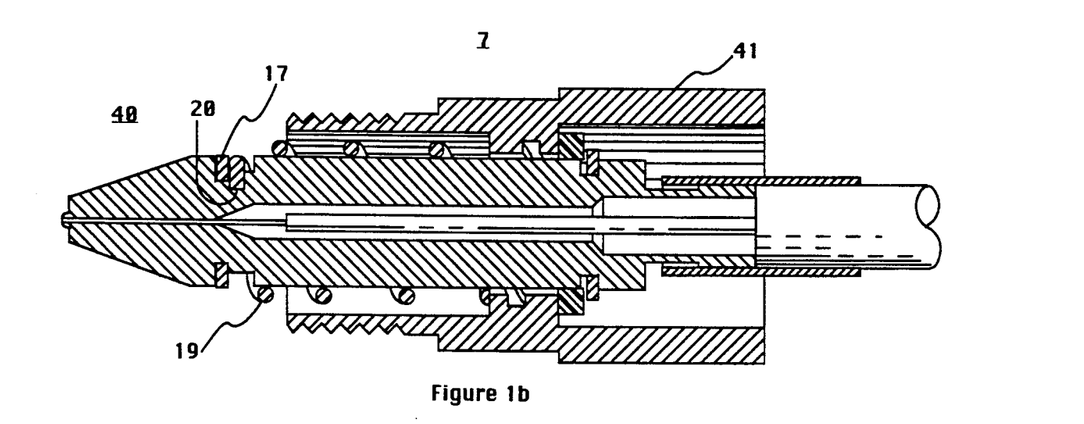
FIG. 1b is a cross-section of the connector and coupling nut in the captured condition for another embodiment of the invention.

In a further embodiment of the present invention, reference is made to FIGS. 1b, 2b, 3b and 4 of the drawings in detail. Referring to FIG. 1b, the connector-nut assembly, generally designated by reference numeral 7, comprises a combined fiber optic connector body 40 and coupling nut 41.

Figure 3B:
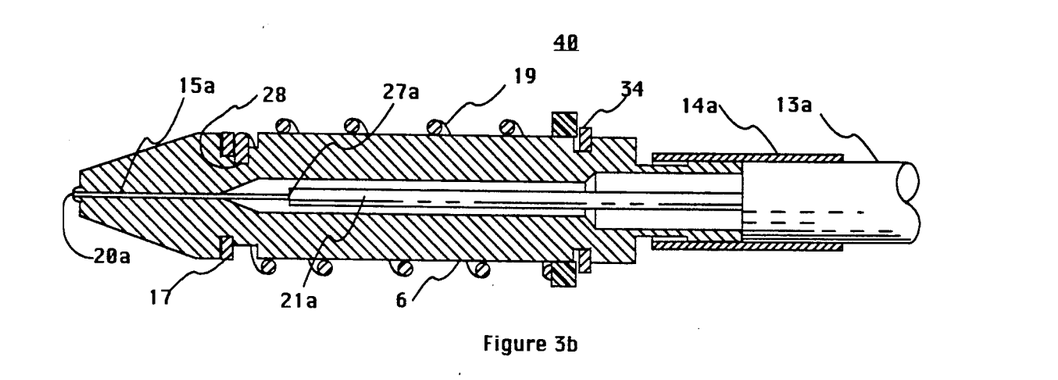
FIG. 3b is a cross-section of the connector body of FIG. 1b without the coupling nut of FIG. 2b

Referring to FIG. 3b, the connector assembly 40 is mated to a fiber optic cable 13a with a crimp coupling 14a. The fiber optic cable 13a contains a fiber 15a with a polished or otherwise well prepared end 20a. Fiber 15a is covered by a buffer coat 21a which is a partially stripped back to point 27a to facilitate fiber end preparation. As previously described, the fiber optic cable 13a may be a sub-unit of a multi-fiber cable in which the connector assembly 40 may be one or several connectors terminating the multi-fiber cable end. The connector body 6 has installed upon it a coil spring 19 having the end proximate the polished fiber end 20a secured to the side of said connector body at point 28. A ring clip 17, next to the secured spring end proximate the polished fiber end 20a, protects the connector body 6 from being scored by the secured spring end.

Figure 2B:
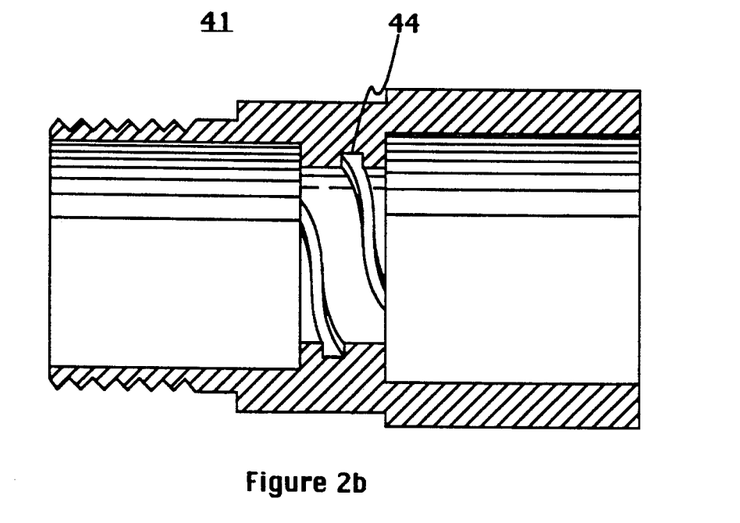
FIG. 2b is a cross-section of FIG. 1b without the connector body.

Referring to FIG. 2b, the coupling nut 41 has an internal groove 44 with an outside diameter somewhat larger than the outside diameter of the spring 19 and inside diameter somewhat larger than the outside diameter of the connector body 6. This groove allows the coupling nut 41 to be screwed onto the spring secured to connector body 6.

Figure 1C:
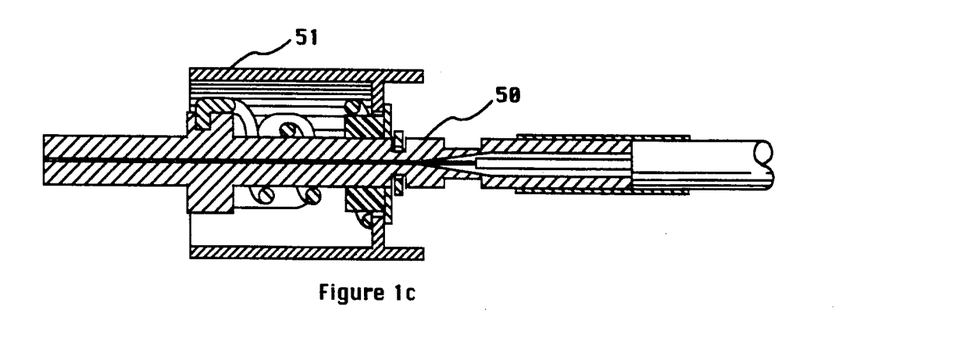
FIG. 1c is a cross-section of the connector and coupling nut in the captured condition for yet another embodiment of the invention.
Figure 2C:
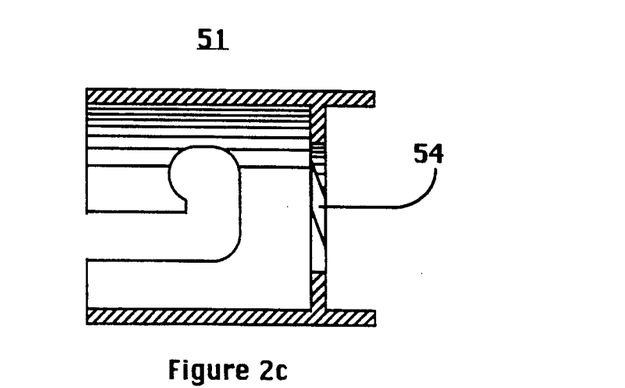
FIG. 2c is a cross-section of FIG. 1c without the connector body.
Figure 3C:
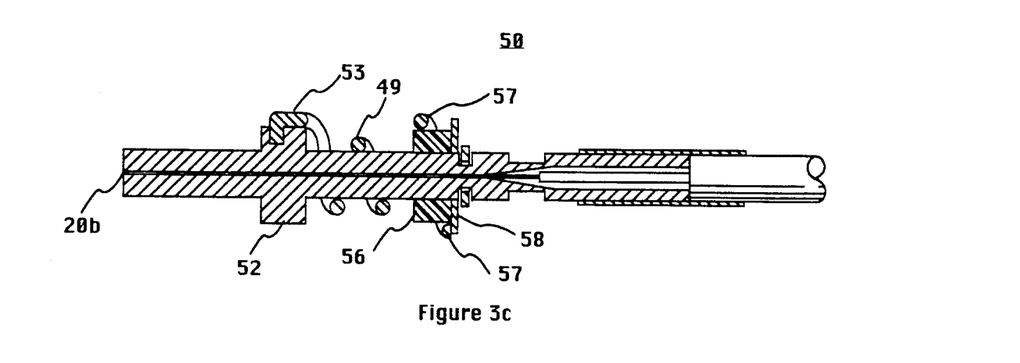
FIG. 3c is a cross-section of the connector body of FIG. 1c without the coupling nut of FIG. 2b
Figure 4:
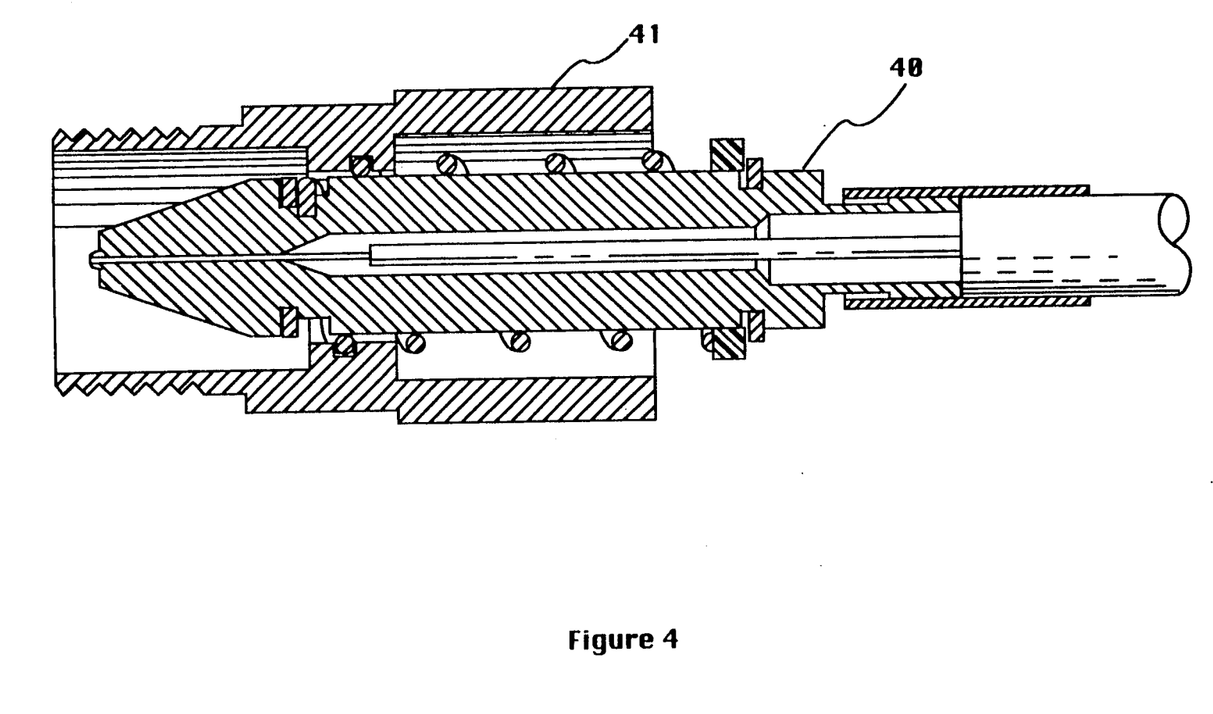
FIG. 4 is a cross-section of the coupling nut of FIG. 2b being installed on the connector body of FIG. 3b.

In a still further embodiment of the present invention, reference is made to FIGS. 1c, 2c, and 3c of the drawings in detail. Referring to FIG. 3c, a connector body 50 has installed upon it a coil spring 49 with an end 53 secured in boss 52, proximate the polished fiber end, and an end 57 freely disposed about boss 56, which is attached to retaining ring 58. The end 53 fits into a corresponding notch in the mating female connector (not shown) to prevent connector rotation.

Referring to FIG. 2c, a coupling nut 51 has an internal groove 54 which provides clearance for the spring end 53. The internal groove 54 has an inside diameter slightly larger than the diameter of first boss 52 and second boss 56 and an outside diameter slightly larger than that of spring ends 53 and 57. This groove allows the coupling nut 51 to be slid over the secured end 53 of said spring.

After the cable and connector body assembly are installed in the duct or other facility, the coupling nut 51 is installed by sliding it over the polished fiber end 20b of the connector. It is then slid over the boss 53 with the internal groove 54 aligned to accommodate spring end 53. It is next slid to boss 56 where groove 54 allows the coupling nut to be screwed onto boss 56 and spring end 57 until the coupling nut 51 rests between the spring and the retaining washer 58, as shown in FIG. 1c.

Figures 5, 5A:
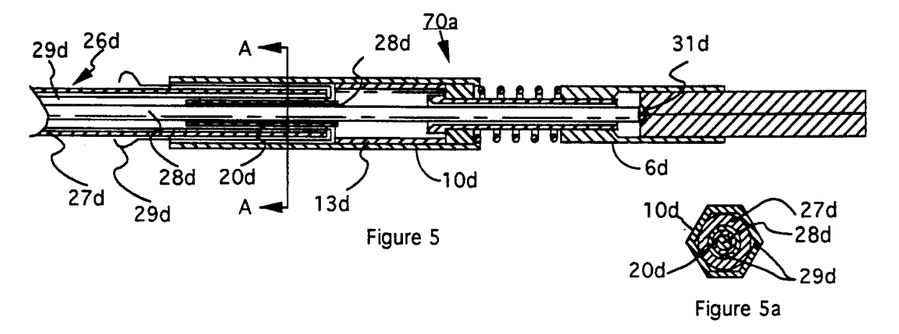
FIG. 5 is a cross-section of the universal connector body which is compatible with ST, SC, FC, and D4 connectors for one embodiment of the invention.
FIG. 5a shows an axial crossection of the universal connector body.

In yet another embodiment of the present invention, reference is made to FIGS. 5a, 5b, and 5c of the drawings in detail. Referring to FIG. 5a, connector assembly 2 includes a fiber optic connector body 61 and coupling nut assembly 69.

Referring to FIG. 5b, assembly 69 has an inner housing 63 which has a longitudinal bore made up of a large internal diameter section 64 and a slightly smaller inner diameter section 68. Sections 64 and 68 are joined at a shoulder 66. Inner housing 63 has a groove 80 for a C-clip 64c which captures a coupling nut 67 between it and a retaining spring 65. Housing 63 has a boss 63c which engages a groove when mating with a similar connector and cable (not shown).

Referring to FIG. 5c, the connector body 61 includes a fiber optic cable 13c, a precision tip 62, a connector body midsection 18c, and a coupling 14c. Coupling 14c crimps cable 13c to midsection 18c. Cable 13c is stripped to expose a fiber 15c with a polished or otherwise well prepared end 20c, and a buffer coat 21c. Fiber 15c is stripped back to point 27c to facilitate fiber end preparation. As previously described, the fiber optic cable 13c may be a sub-unit of a multi-fiber cable in which assembly 2 may be one of several connectors terminating the multi-fiber cable end. Midsection 18c has a diameter slightly greater than the diameter of the precision tip 62. The diameters join at a shoulder 19c.

Section 68 of the inner housing 63 has an internal diameter slightly smaller than the outer diameter of midsection 18c, such that, when section 64 of assembly 69 is slid over the precision tip 62 of the connector body 61 and toward the cable end of the connector body 61, the shoulder 68 of the coupling nut assembly 69 comes to rest against the shoulder 19c of the connector body as shown in FIG. 5a. In this position the coupling nut assembly 69 is captured on the connector body 61 with a suitable fastening means known in the industry. Typical fastening methods may be by epoxy means or screw threads, etc.

Figure 6:
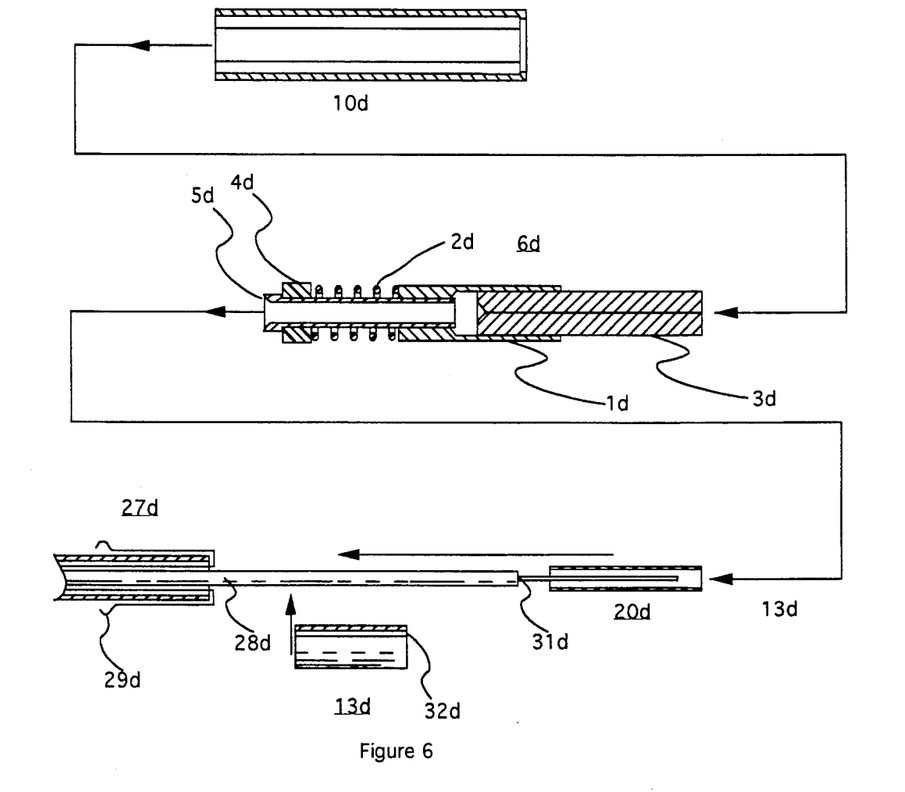
FIG. 6 shows the assembly sequence for the universal connector body.

In another embodiment of the present invention, reference is made to FIGS. 5, 5a, and 6 of the drawings. FIG. 5 shows the universal connector body 70a terminated to an optical fiber cable 26d. The optical fiber cable is of a known construction having the cable jacket cut back to expose a buffered optical fiber 28d surrounded by an aramid yarn strength member 29d which exits the cable at the end point of the cable jacket 30d. The unique design of the universal connector body allows the strength member to exit the end point of the cable jacket 30d and loop back over the outside of the cable 26d. Referring to FIG. 5a, this unique design involves the construction of the crossection of the accumulator/crimp sleeve 10d as a regular polygon, enabling the aramid yarn strength member 29d to loop back over the outside of the cable 26d into the space between the cable jacket 27d and the polygon-shaped internal diameter of the accumulator/crimp sleeve 10d, as shown in FIG. 5a. Referring to FIG. 6, a cylindrical crimp anvil 20d is slid over the buffered optical fiber 28d and inserted between the buffered optical fiber and the aramid yarn 29d. This crimp anvil 20d allows the aramid yarn 29d in the cable, the cable jacket 27d and the looped back aramid yarn to be crimped together between the crimp anvil 20d and the accumulator/crimp sleeve 10d. This double-crimping of the aramid yarn securely ties the universal connector body 70a to the fiber optic cable 26d allowing the full strength of the aramid yarn to be used to pull the cable assembly into the communication facility.

In another embodiment of the present invention, reference is made again to FIG. 6 which shows the procedure for assembly of universal connector body 70a. The universal connector body 70a is composed of spring tip 6d, accumulator/crimp sleeve 10d, spacer 13d, and crimp anvil 20d.

FIG. 6 also shows the crossection, exposing the details, of the spring tip 6d of the universal connector body 70a, which is composed of a precision tip 3d for centering and securing the fiber of fiber optic cable 26d, a spring tip spring 2d for providing a force to maintain the precision tips of mated connectors in contact, fiber tube 5d which aids in feeding the fiber 30d into the precision tip, sliding key 4d, and outer tube 1d. The precision tip 3d is secured to the outer tube 1d which is secured to the fiber tube 5d.

FIG. 6 shows the procedure for assembling the universal connector body onto cable 26d containing buffered fiber 28d. The cable 26d is prepared by stripping it back exposing the buffer tube 28d. The buffer tube is stripped back a predetermined length exposing the fiber 31d. The crimp anvil 20d is inserted between the aramid strength member 29d of the cable 26d to provide a rigid surface upon which to crimp the accumulator/crimp sleeve 10d. The spring tip 6d is installed over the fiber 31d and the buffer tube 28d and secured in place, as shown. The spacer 13d is a cylinder with a longitudinal slot 32d wide enough to accept the buffered fiber 28d. The spacer is installed over the buffered fiber 28d, between the spring tip 6d and the cable 26d, through slot 32d of the spacer 13d. Finally, the accumulator/crimp sleeve is slid over the spring tip, spacer, cable and aramid yarn and crimped to the cable at the center of the accumulator/crimp.

Figure 7:
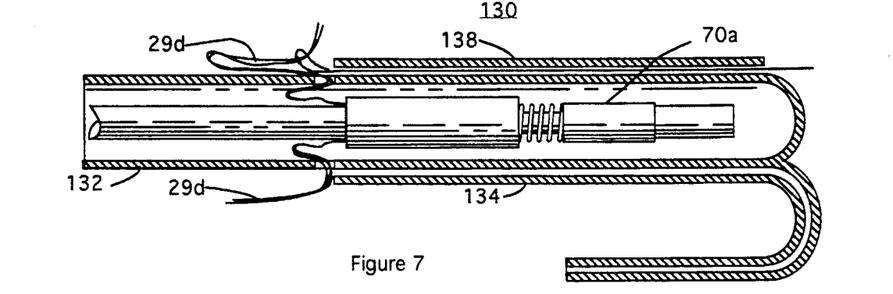
FIG. 7 shows the procedure for inserting the aramid yarn (kevlar) strength member of the fiber optic cable into the pulling protector which houses and protects one or more universal connector bodies during installation for another embodiment of the present invention.
Figure 8:
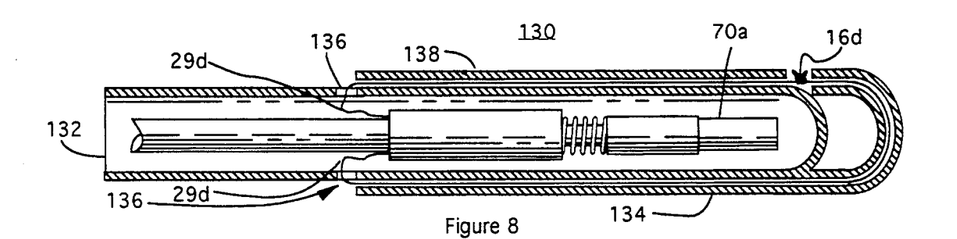
FIG. 8 shows the procedure for tying the aramid yarn strength member to secure the pulling protector in the pulling configuration.

In still another embodiment of the present invention reference is made to a cable assembly pulling protector 130, shown in FIGS. 7 and 8, for pulling one or more pre-terminated universal connector bodies 70a into the duct or other distribution facility of a communication network.

The pulling protector 130 consists of a central cylinder 132 large enough to house one or several pre-terminated universal connector bodies. The central cylinder 132 is securely attached to one or more open-ended tubes 134 and one or more open-ended tubes 138 to house the aramid yarn of the fiber optic cable pre-terminated to the universal connector bodies for pulling the pre-terminated universal connector bodies into the duct or other distribution facility of a communication network. FIG. 7 shows the first step in the installation of the pulling protector 130 which is the process of inserting the universal connector body or bodies with untrimmed aramid yarn 26d into the pulling protector and inserting the aramid yarn 26d into open-ended tubes 138 and 134 of the pulling protector 130.

FIG. 8 shows the second step in the installation of the pulling protector 130 which is the process of tying the aramid yarn 26d into a knot 16d to secure pulling protector 130 in the pulling configuration. Referring to FIG. 8 at least one open ended tube 134 is long enough and flexible enough to allow it to be looped around to another open ended tube 138 where the loop is secured for pulling by tying the aramid yarn. Openings 136 are provided in the side of central cylinder 132 near the beginning of the open-ended tubes for feeding through the aramid yarn from the cable of the connector bodies.

The pulling protector 130 is used to pull or otherwise install universal connector body 70a in a communications facility. The aramid yarn 26d is severed from the universal connector body after installation.

In another embodiment of the present invention reference is made to FIGS. 5, 5a, 6, 9, 9a, and 13 of the drawings for a method of adjusting the precision tip of the universal connector body to minimize the connection loss.

After installation of the connector body in a pulling protector inside a duct or other communications facility, the universal connector body is removed from the pulling protector and the aramid yarn 26d is severed from the universal connector body.

Figures 9, 9A:
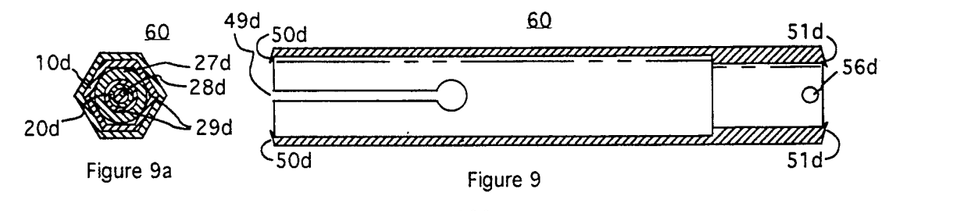
FIG. 9 shows the universal inner housing which can be mated to a variety of outer housing configurations including ST, SC, FC, and D4 types. The pre-terminated universal connector body is slid the universal inner housing enabling it to be connected to communications networks.
FIG. 9a shows a cross section of the universal connector body inserted into the inner housing. The outer housing is omitted for clarity.
Figure 13:
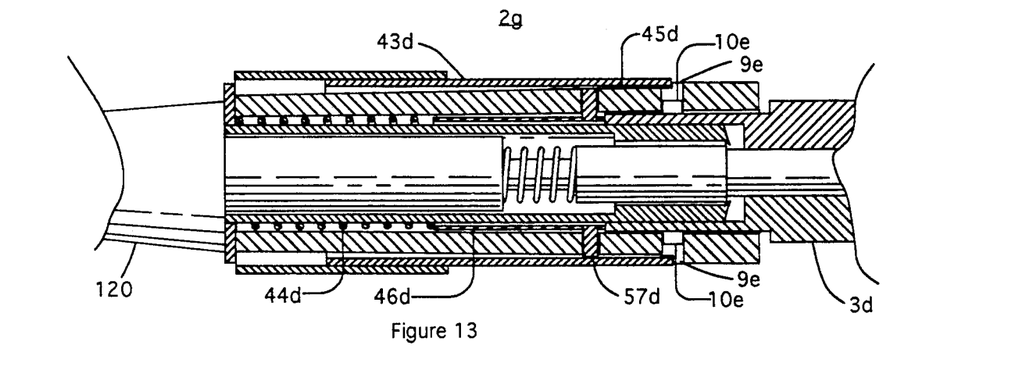
FIG. 13 shows the longitudinal crossection of the ST outer housing configuration plugged into a coupling receptacle of FIG. 12, showing the jaw hold out pushed into the retracted position by the coupling receptacle.

FIG. 9 shows the universal inner housing 60. In FIG. 13 he universal inner housing 60 is shown mated with the universal connector body 70a at its interior, after having one of various outer housings (ST, in this case) installed about its exterior, to enable the universal connector body 70a to be connected to a communications network.

Referring to FIG. 9 to mate the universal connector body with the universal inner housing, the pre-connectorized universal connector body 70a is slid into the interior of the universal inner housing 60 past retaining tabs 50d. Expansion slot 49d enables the universal connector body to force open the end of the inner housing, enabling the universal connector body to be captured within the inner housing between tabs 50d and tabs 51d at the other end.

The universal connector body 70a and the universal inner housing 60 have several unique features. Referring to FIG. 6 the fiber tube 5d of the universal connector body 70a is securely mated to the precision tip 3d through the outer housing 1d. The fiber tube 5d has an external geometrical crossection which mates with a sliding fit to the internal geometrical crossection of the sliding key 4d. This allows the sliding key 4d to slide on the fiber tube without rotation, while pushing the precision tip 3d forward by the spring 2d to mate the precision tip 3d with the precision tip of the mating connector.

The sliding key 4d has an external geometrical crossection which mates with a sliding fit to the internal geometrical crossection of the accumulator/crimp sleeve 10d which allows it to slide on the sliding key without rotation.

The accumulator/crimp sleeve 10d has an external geometrical crossection which mates with a sliding fit to the internal geometrical crossection of the inner housing 60. This intermating of geometrical crossections allows all components to slide within each other without rotation.

The the unique inter-matability of the components of the universal inner housing and the universal outer housing enable the user to index the universal connector body within the universal inner housing by removing the connector and rotating the connector body in 45-degree increments for an octagon cross section, 60-degree increments for a hexagon cross section, and so on. Each rotational index allows the connector body to mate with its counterpart connector body at a different angle. The loss at each angle can be recorded and the angle of minimum power loss or minimum power back-reflection can be selected. This approach is particularly useful in the establishment of single-mode transmission links using lasers or laser diodes where the loss and back-reflection values affect the performance of the link.

Anytime after the pre-connectorized universal connector body is captured within the inner housing, expansion of the universal inner housing at slot 49d using the proper tool allows the universal connector body to be removed, rotated, and reinserted. This ability to change the orientation of the universal connector body with respect to the inner and outer housings is an improvement over connectors presently available on the market. Conventional connectors enable indexing of the fiber cable mated to the precision tip before final assembly. However these connectors require that the precision tp be cemented in place at final assembly to prevent rotation during use. The present invention does not require the connector parts to be cemented in place, because the unique inter-mating geometrical cross sections of the connector body and inner housing prevent rotation after assembly.

According to another aspect of this invention, reference is made to FIGS. 1c, 2c, 10, 11, 12, and 13. These drawings depict an improvement over the conventional push-and-twist ST connector in favor of a novel push-pull ST-compatible outer housing which mates with the universal connector body after it is pulled into a communications facility.

FIGS. 1c and 2c show one embodiment of the present invention which is a duct-pullable ST-compatible connector which allows the coupling nut 51 to be installed after the pre-connectorized connector body 50 is pulled into a communications duct or other cable routing facility. However, the coupling nut 51 of this approach, is mated to the coupling receptacle with a twist-and-push action. This necessity to twist-and-push this connector precludes placing connector receptacles in close proximity.

Figure 10:
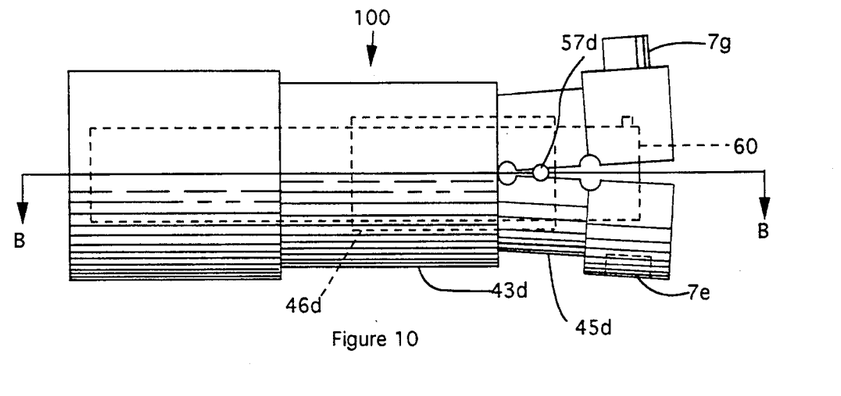
FIG. 10 shows the ST outer housing which is assembled onto the universal inner housing for mating with the a pre-terminated universal connector body after the pre-terminated universal connector body is pulled into a communications duct. This figure shows how the extended position of the jaw hold out forces the polymeric jaw of the connector open when the connector is in an unmated configuration.
Figure 11:
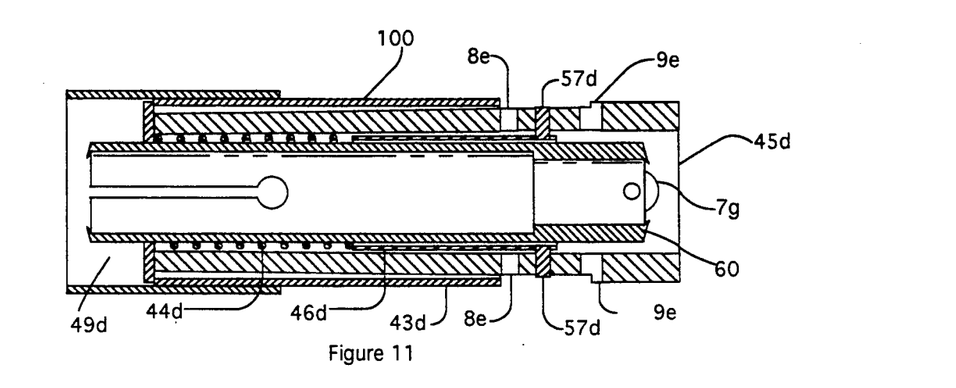
FIG. 11 shows a longitudinal cross section of the ST outer housing assembled onto the universal inner housing of FIG. 10, showing the extended position of the jaw hold out.

FIGS. 10 and 11 show another embodiment of the present invention, the ST outer housing 100. This outer housing is mated with the universal inner housing 60 to accept the universal connector body 70a. The ST outer housing 100 is composed of the polymeric jaw 45d, which opens into two halves, a coupling key 7g on one half of the polymeric jaw, a coupling key receptacle 7e on the other half of the polymeric jaw, a jaw clamp 43d for clamping the polymeric jaw shut, a jaw hold out 46d for holding the polymeric jaw 45d open, a jaw hold out boss 57d, attached to the jaw hold out, which slides between the two halves of the polymeric jaw, a jaw hold out boss cut-out 8e for receiving the jaw hold out boss when the polymeric jaw is closed, a coupling receptacle boss cut-out 9e for receiving the coupling receptacle boss 10e when the polymeric jaw is closed, and a hold out spring 44d for pushing the jaw hold out 46d into position to hold the polymeric jaw 45d open.

Referring to FIGS. 10, 11, 12, and 13 the ST outer housing operates as follows: FIGS. 10 and 11 show the outer housing in an uncoupled condition. In this condition the jaw clamp 43d is pulled back allowing the hold out spring 44d to push the jaw hold out 46d into the forward position. In this position, the jaw hold out boss 57d moves out of the jaw hold out boss cut-out forcing the polymeric jaw 45d open as shown in FIG. 10. In this position the jaw hold out 46d is partially blocking the cavity for the coupling receptacle 3e and the polymeric jaw is held open by the jaw hold out boss. The open polymeric jaw 45d keeps the jaw clamp 43d open.

Figure 12:
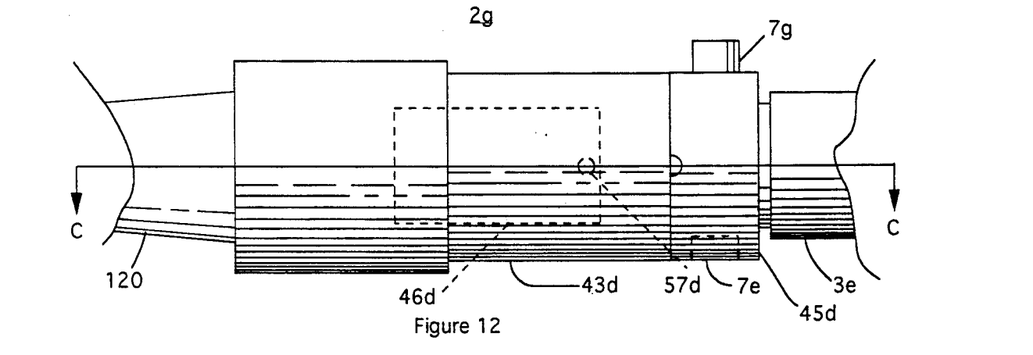
FIG. 12 shows the ST outer housing configuration of FIG. 10 with the universal connector body inserted. The assembly is plugged into a coupling receptacle for mating to another ST connector.

FIGS. 12 and 13 show the ST-compatible connector assembly 2g of this invention, with the strain relief boot 120 installed, coupled to coupling receptacle 3d. In this condition the jaw hold out 46d has been pushed back compressing the hold out spring 44d. In this position, the jaw hold out boss 57d moves into the jaw hold out boss cut-out 8e allowing the polymeric jaw 45d to close capturing the coupling receptacle bosses 10e in the coupling receptacle boss cut outs 9e as shown in FIG. 12. The polymeric jaw 45d is kept closed when the jaw clamp 43d is pushed toward the coupling receptacle 3g until it reaches its detent position over the coupling receptacle boss cut-out 9e.

According to another aspect of the present invention, reference is made to FIGS. 14, 15, 16, and 17 of the drawings. These figures refer to a device and method for combining the ST connector assemblies of this invention into a high density duplex connector.

Figure 14:
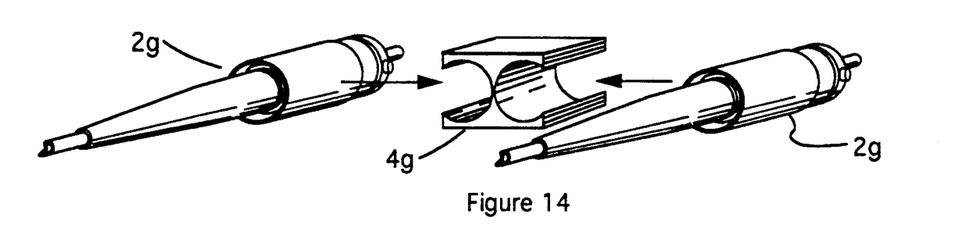
FIG. 14 shows a method for using an ST connector clamp for combining two ST outer housings into a high-density duplex connector assembly using an outer housing clamp.
Figure 15:
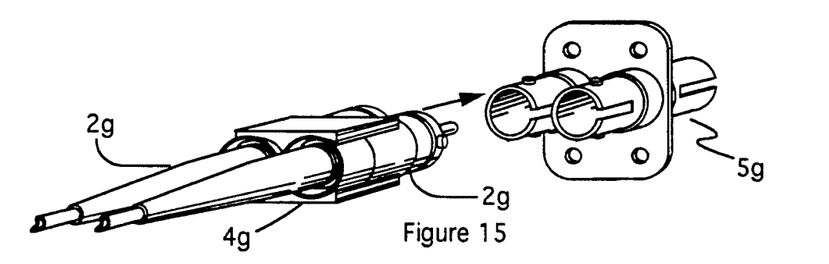
FIG. 15 shows a method for combining two ST coupling receptacles into a high-density duplex coupling receptacle assembly to receive the high-density duplex connector assembly.
Figure 16:
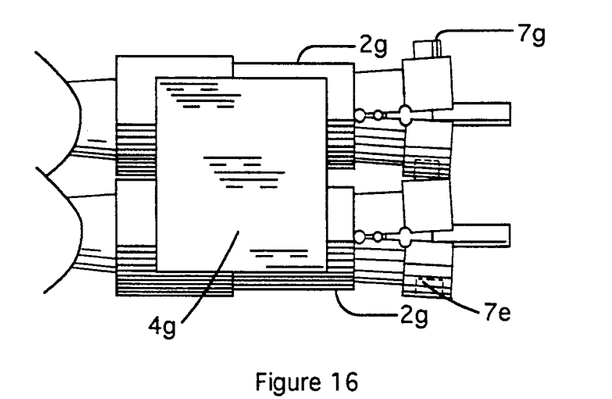
FIG. 16 and 17 show the top view of the two ST coupling receptacles combined into a high-density duplex coupling receptacle assembly of FIG. 15, showing the way the coupling key of one connector plugs into the jaw boss receptacle of the other connector.
Figure 17:
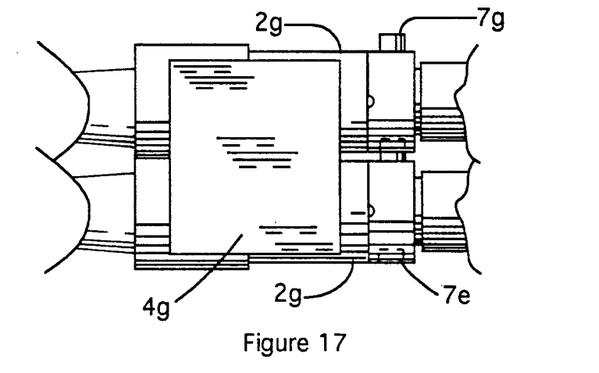

FIG. 14 shows two ST-compatible connector assemblies 2g being inserted into outer housing clamp 4g. FIG. 15 shows the clamped connectors being plugged into a high density duplex coupling receptacle 5g. FIGS. 16 and 17 demonstrate how the coupling key 7g of one connector is inserted into the coupling key receptacle 7e of another to lock the two connector polymeric jaws together, maintaining proper orientation while clamped in the Outer housing clamp.

It should be further understood that the applicant has disclosed and described the invention making reference only to certain preferred embodiments of the invention and the best modes for carrying out the invention which are now known to applicant.

However, the applicant contemplates that there may be various other adaptations and alterations for the method and apparatus disclosed herein and claimed. Thus, the applicant intends that all such adaptations and variations are all within the spirit of this invention and the appended claims.

I claim:

1. An apparatus for terminating cables for connection to communications or data devices or other cables comprising:
   A cable having a channel for passing signals;
   an elongated, generally cylindrical, body having means for receiving said cable and means for securely affixing said cable to a first end of said body so that said channel is exposed at a second end, said body further having first retaining means disposed on the cylindrical surface approximately about the mid-section of said body;
   a coil spring having a predetermined pitch with an inner diameter slightly larger than the outer diameter of said body, being placed over said body, said spring having a first coil end fixed to said body at said second end and having a second coil end disposed near the midsection of said body for acting as a second retaining means;
   a coupling nut having a first portion with an inner diameter larger than the outer diameter of said coil spring and a threaded portion having said predetermined pitch with an inner diameter slightly larger than the outer diameter of said body, said coupling nut being screwed onto said coil spring wherein said threaded portion engages said coil spring thereby moving said nut towards said first end until said spring is compressed and until said threaded portion is captured between said first retaining means and said second retaining means.

2. The apparatus of claim 1 wherein said receiving means comprises:
   a cylindrical bore generally parallel to the axis of said cylindrical body for receiving therethrough said channel.

3. The apparatus of claim 2 wherein said first retaining means comprises:
   said body including a circumferential groove disposed approximately about the mid-section; and
   a flexible retaining ring having an outer diameter approximately the same as the outer diameter of said coil spring and an inner diameter slightly smaller than the outer diameter of said groove;
   said groove receiving said retaining ring, said ring operating to stop said nut from advancing as said nut is being screwed onto said spring thereby compressing said spring until said threaded portion is captured between said second coil end and said ring.

4. The apparatus of claim 3 wherein said spring provides a means for keying said connector body at the end opposite that to which the cable is attached.

5. The apparatus of claim 3 wherein said a ring clip next to said first coil end protects said body from scoring by said first coil end.

6. Apparatus for terminating fiber optic cables for connection to communications of data devices of other fiber optic cables comprising:
   A fiber optic cable having a fiber with a polished end for passing signals;
   an elongated, generally cylindrical, connector body having means for receiving said cable and means for securely affixing said cable to a first end of said body so that said polished end of said fiber is exposed at a second end, said body further having first retaining means disposed on the cylindrical surface approximately about the mid-section of said body;
   a coil spring having a predetermined pitch with an inner diameter slightly larger than the outer diameter of said body, being placed over said body, said spring having a first coil end fixed to said body at said second end and having a second coil end disposed near the mid-section of said body for acting as a second retaining means;
   a coupling nut having a first portion with an inner diameter larger than the outer diameter of said coil spring and a threaded portion having said predetermined pitch and said inner diameter slightly than the outer diameter of said body, said coupling nut being screwed onto said coil spring wherein said threaded portion engages said coil spring thereby moving said nut towards said first end until said spring is compressed until said threaded portion is captured between said first retaining means and said second retaining means.

7. The apparatus of claim 6 wherein said receiving means comprises:
   a cylindrical bore generally parallel to the axis of said cylindrical body for receiving therethrough said fiber.

8. The apparatus of claim 7 wherein said first retaining means comprises:
   said body including a circumferential groove disposed approximately about the mid-section; and
   a flexible retaining ring having an outer diameter approximately the same as the outer diameter of said coil spring and an inner diameter slightly smaller than the outer diameter of said groove;
   said groove receiving said retaining ring, said ring operating to stop said nut from advancing as said nut is being screwed onto said coil spring thereby compressing said spring until said threaded portion is captured between said second coil end and said ring.

9. The apparatus of claim 8 wherein said spring provides a means for keying said connector body at the end opposite to which the cable is attached.

10. The apparatus of claim 8 wherein said spring provides a means for keying said connector body at the end opposite to which the cable is attached.

11. A method for terminating fiber optic cables in order to connect to communications or data devices or other fiber optic cables comprising the following steps:
   A. securely attaching a fiber optic cable to one end of an elongated generally cylindrical connector body;
   B. extending a fiber through a longitudinal bore in the connector body such that an end of the fiber is exposed at the end of the connector body opposite the end to which the cable is attached;
   C. disposing around said connector body a retaining means;

D. disposing around said connector body a coil spring having a first end fixed to said connector body at said opposite end to which the cable is attached and a second end of said spring proximate to said retaining means, said spring having a predetermined pitch;

E. rotating a coupling nut onto said spring, said coupling nut having a first portion with an inner diameter slightly larger than the outer diameter of said spring, and a threaded portion having said predetermined pitch and an inner diameter slightly larger than the outer diameter of said body;

F. advancing said coupling nut along said spring until the leading edge of said threaded portion reaches said retaining means;

G. continuing to rotate said nut onto said spring, compressing said spring until said second end of said spring rests against the trailing edge of said threaded portion thereby capturing said nut.

12. The method of claim 11 which involves disposing said retaining means around said connector body comprising the steps of:

A. disposing about said body a circumferential groove approximately at the mid-section; and B. disposing about said circumferential groove a flexible retaining ring having an outer diameter approximately the same as the outer diameter of said coil spring and an inner diameter slightly smaller than the outer diameter of said groove;

C. advancing said coupling nut along said spring thereby compressing said spring until said threaded portion is captured between said second coil end and said retaining means.

13. The method of claim 12 further comprising the step of providing a means for keying said connector body using said first coil end, fixed to said connector body end opposite to which the cable is attached.

14. The method of claim 12 further comprising the step of providing a ring clip next to said first coil end for protecting said body from scoring by said first coil end.

15. A new and improved apparatus for use in installing fiber optic cables, said apparatus comprising:

an elongated, generally cylindrical body with means for securely affixing the cable end of said body to a fiber optic cable;

said elongated body having a longitudinal bore generally parallel to the axis of said elongated body for receiving therethrough a fiber of the fiber optic cable;

a coupling nut having means for mating with said elongated body and further means for connecting said fiber optic cable to a communications network device; and said elongated body further having means disposed along the outer surface of said body for interacting with the mating means of said coupling nut and for receiving and securely retaining said coupling nut such that said fiber optic cable, together with said elongated body, may be connected by said coupling nut to said communication network device; and wherein said coupling nut having an internal circumferential spiral groove about its neck region and said spiral groove having a diameter to receive a coupling nut receiving and retaining means of said elongated body;

said coupling nut receiving and retaining means of said elongated body including at least one means of impeding said coupling nut as it is moved along the outer mid-section surface of said elongated body toward said cable end; and said coupling nut receiving and retaining means of said elongated body further including at least one spring disposed about the outer mid-section surface of said elongated body distal said cable end; and said spring having an inner diameter generally larger than the outer diameter of said elongated body and an outer diameter slightly smaller than the outer diameter of said internal circumferential spiral of said coupling nut, such that when said coupling nut is received by said elongated body with said spring disposed about its outer midsection surface, said coupling nut will receive said spring into its internal groove as it is rotated along the elongated body until the spring exits said coupling nut which will then be securely retained between said spring and said coupling nut retaining means and the coupling nut will be securely mated to said elongated body.

16. A new and improved method for installing fiber optic cables comprising the following steps:

A. securely attaching a fiber optic cable to one end of an elongated generally cylindrical connector body;

B. extending a fiber through a longitudinal bore in the connector body such that an end of the fiber is exposed at the end of the connector body opposite the end to which the cable is attached;

C. disposing circumferential means about the outer surface of the mid-section of said connector body for receiving and retaining a coupling nut in place about a portion of the connector body;

D. disposing circumferential means about the interior surface of the coupling nut such that said coupling nut may be mated with the outer surface of said connector body; and wherein the steps of disposing circumferential means about the connector surface for receiving and retaining a coupling nut and the step of disposing circumferential means about the interior of the coupling nut include the following steps:

E. disposing about the outer mid-section of said elongated body proximate said cable end at least one means of impeding said coupling nut as it is moved along the outer mid-section surface of said elongated body toward said cable end; and F. disposing about the outer mid-section of said elongated body at least one spring having an inner diameter generally larger than the outer diameter of said elongated body and an outer diameter slightly smaller than the outer diameter of said internal circumferential spiral of said coupling nut;

G. advancing said coupling nut with said spiral groove disposed about its internal diameter along said connector body in the direction of the cable end of the body until said coupling nut reaches said spring disposed about said connector body;

H. rotating said coupling nut as it is advanced toward said cable end along the mid-section of said connector body over which said spring is disposed;

I. enabling said coupling nut to receive said spring into is internal groove as it is rotated long the elongated body;

j. rotating said coupling nut as it is advanced along said connector body toward said cable end until said spring exits said coupling nut which will then be securely retained between said spring and said coupling nut retaining means and the coupling nut will be securely mated to said elongated connector body.

17. Apparatus for use in installing one or more fiber optic cable assemblies comprising:
- one or more universal connector bodies which are securely and longitudinally terminated to one or more fiber optic cables, respectively, each of said connector bodies having an external longitudinal section with a polygon shape;
- said external longitudinal section with a polygon shape allowing double crimping of the aramid yarn securely tying the universal connector body to the fiber optic cable allowing the full strength of the aramid yarn to be used to pull the cable assembly into the communication facility.
- a pulling protector coupled to said one or more universal connector bodies for pulling said one or more cable assembles into a duct or other distribution facility of a communication network;
- a universal inner housing, into which each universal connector body is longitudinally and concentrically installed;
- an outer housing coupling to said each universal inner housing for longitudinally receiving said universal connector body thereby completing a connector assembly 18. The apparatus of claim 17 wherein each of said one or more universal connector bodies comprises:
- a spring tip for terminating said fiber optic cable;
- an accumulator/crimp coupled to said spring tip for accepting slack of said fiber optic cable when said spring tip retracts into said accumulator/crimp, which is installed longitudinally over said aramid yarn and said fiber optic cable, for securing said cable to said accumulator/crimp.

19. The apparatus of claim 17 wherein said pulling protector comprises:
- a central tube to house one more preterminated universal connector bodies;
- said central tube coupled to one or more openended tubes to house the aramid yarn for pulling said cable assemblies into the duct or other distribution facility;
- said central tube having openings near a third end of said open-ended tubes for feeding through said aramid yarn from said cable assemblies.

20. The apparatus of claim 17 wherein said each universal inner housing comprises:
- an internal longitudinal section at a slotted first end for mating with and indexing the rotation of said polygon shape of said connector body, said slotted first end of said universal inner housing having a cross section to index the universal connector body within the universal inner housing.

21. The apparatus of claim 20 where said connector body and said universal inner housing have a hexagon cross section to enable incremental rotation of the universal connector body within the universal inner housing in 60-degree increments.

22. The apparatus of claim 20 where said connector body and said universal inner housing have an octagon cross section to enable incremental rotation of the universal connector body within the universal inner housing in 30-degree increments.

23. The apparatus of claim 17 wherein said outer housing is an ST-compatible high density push-pull type comprising:
- a polymeric jaw externally disposed about a jaw hold out which is longitudinally coupled to a jaw hold out spring, said polymeric jaw and said jaw hold out and said jaw hold out spring being installed concentrically into a jaw clamp which keeps said polymeric jaw closed after it engages a coupling receptacle;
- said jaw spring keeping said jaw hold out in an extended position which holds said polymeric jaw open unless said jaw hold out is retracted by inserting a coupling receptacle into said polymeric jaw and said jaw clamp is positioned to clamp said polymeric jaws shut.

24. The apparatus of claim 17 where said inner housing allows ST-, SC-, FC-, and D4-compatible outer housings or coupling assemblies to be distributed about its exterior for connection to other ST, SC, FC, and D4 connectors, respectively.

25. A method for mating and installing one or more fiber optic cables including the steps of:
- A. securely and longitudinally terminating one or more universal connector bodies to one or more fiber optic cables, each of said connector bodies having an external longitudinal section having a polygon shape;
- B. providing an excess length of aramid yarn, after termination of said one or more universal connector bodies to one or more fiber optic cables, for attachment of a pulling protector;
- C. coupling said pulling protector to said one or more universal connector bodies for pulling said one or more pre-terminated universal connector bodies into a duct or other distribution facility of a communication network;
- D. pulling said one or more pre-terminated universal connector bodies into said duct or said other distribution facility of a communication network;
- E. removing said excess length of aramid yarn and said pulling protector, after pulling said one or more pre-terminated universal connector bodies into said duct or said other distribution facility;
- F. coupling one or more connector outer housings to one or more universal inner housings, respectively;
- G. installing each universal connector body into each universal inner housing coupled with an outer housing, thereby completing a connector assembly;
- H. indexing the universal connector body with respect to the universal inner housing to optimize the connection loss and preventing the rotation of the universal connector body with respect to the universal inner housing by intermating geometrical crossections;
- I. installing said connector assembly onto a coupling receptacle.

26. The method of claim 25 where securely and longitudinally terminating one or more universal connector bodies to one or more fiber optic cables includes the steps of:
- A. sliding a fiber into a spring tip with adhesive applied;
- B. curing or otherwise setting said adhesive;
- C. polishing or otherwise preparing a spring tip end of said fiber;
- D. sliding an accumulator/crimp sleeve over said spring tip and length of aramid yarn;
- E. crimping said cable and said aramid yarn using said accumulator/crimp sleeve.

27. The method of claim 25 wherein coupling a pulling protector to said one or more universal connector bodies for pulling said one or more pre-terminated universal connector bodies into said duct or said other distribution facility of said communication network includes the steps of:
   A. leaving an extra length of aramid yarn of said fiber optic cables attached to each universal connector body after crimping;
   B. inserting one or more universal connector bodies into a central tube of said pulling protector;
   C. inserting said aramid yarn into open-ended tubes of said pulling protector;
   D. tying said aramid yarn to secure said pulling protector.

28. The method of claim 25 wherein coupling one or more connector bodies to one or more universal inner housings, respectively, includes the steps of:
   A. providing a geometrical receiving hole in said inner housing to receive said universal connector body;
   B. providing an internal geometrical crossection in said universal inner housing to receive a matching internal geometrical crossection of said universal connector body to prevent the rotation of said universal connector body with respect to said universal inner housing after mounting of said universal connector body in said universal inner housing;
   C. sliding a first end of said universal connector body into said receiving hole until said connector body is captured in said universal inner housing between retaining tabs at said first end and retaining tabs at a second end.

29. The method of claim 25 wherein providing an indexing method to allow the indexing of the universal connector body with respect to the universal inner housing to optimize the connection loss includes the steps of:
   A. Testing the connection loss;
   B. expanding said first end of said inner housing and removing said universal connector;
   C. turning said universal connector body so that a geometrical cross section of the universal connector body indexes with respect to the universal inner housing;
   D. reinserting said connector body into said inner housing and measuring the loss; repeating the process and discontinuing the turning of the connector body when the connection loss reaches a minimum.

30. The method of claim 25 where said connector assembly is ST-compatible and installing said ST-compatible connector assembly onto said coupling receptacle comprises the steps of:
   A. grasping the jaw clamp of said ST-compatible outer housing between two fingers and pushing it toward the coupling receptacle with the key of said connector assembly oriented toward a slot on a side of the coupling receptacle;
   B. pushing back the jaw hold out of said connector assembly with said coupling receptacle by pushing said connector assembly onto said coupling receptacle;
   C. allowing said polymeric jaw of said connector assembly to snap shut as said knobs on said coupling receptacle enter an opening of said polymeric jaw when said connector assembly is pushed home into said coupling receptacle;
   D. Pushing a jaw clamp to disengage it from a first detent position and bring it to rest in a second detent position, locking said polymeric jaw securely in place over said coupling receptacle.

* * * * *